July 21, 1931.   J. W. LEGG   1,815,064
OPERATING MECHANISM FOR A RECORD RECEIVING MEMBER
Filed May 31, 1927   2 Sheets-Sheet 1

INVENTOR
Joseph W. Legg
BY
ATTORNEY

July 21, 1931.  J. W. LEGG  1,815,064

OPERATING MECHANISM FOR A RECORD RECEIVING MEMBER

Filed May 31, 1927   2 Sheets-Sheet 2

INVENTOR
Joseph W. Legg
BY
ATTORNEY

Patented July 21, 1931

1,815,064

UNITED STATES PATENT OFFICE

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA

OPERATING MECHANISM FOR A RECORD-RECEIVING MEMBER

Application filed May 31, 1927. Serial No. 195,400.

My invention relates to a device or mechanism for controlling movement of a record-receiving surface, as a web-like sheet, photographic film, or the like.

In accordance with my invention, a record-receiving surface, as aforesaid, disposed upon a supply reel or spool is wound upon a second reel or spool after passing into engagement with a driven drum or roll which comprises driving mechanism for operating a second drum or roll co-acting with and driving said second reel or spool.

More particularly, in accordance with my invention, the aforesaid driving mechanism comprises one or more elastic belts co-acting directly with the aforesaid drums.

My invention involves mechanism of the general character of that described in my United States Patent No. 1,563,382, granted December 1, 1925, but is an improvement on the therein-disclosed mechanism, particularly in that higher constant linear velocity of the record-receiving surface may be established and maintained.

My invention resides in mechanism of the character hereinafter described and claimed.

For an illustration of one of the various forms my mechanism may take, reference is to be had to the accompanying drawings, in which Figure 1 is a side elevational view, partly in vertical section, of a device embodying my invention and having one of its housing sections removed.

Figure 1:
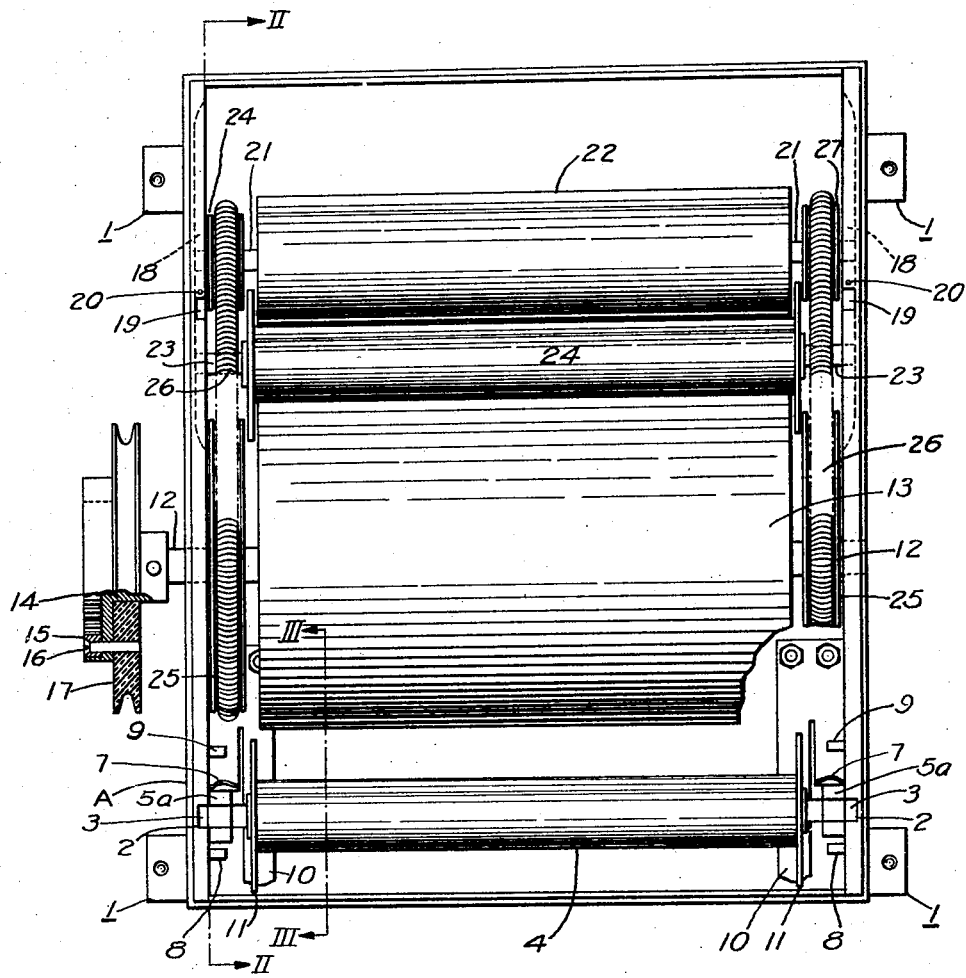

Referring to the drawings, there is illustrated a housing or casing comprising the parts or sections A and B. In the example illustrated, all of the operating mechanism is supported by the housing section A, the co-operating section B serving as a cover for such mechanism. Housing sections A and B may be detachably related or secured together in any suitable manner, preferably, however, by utilizing a plurality of alined members projecting from each and secured together in spaced relation in any suitable manner, as by screws (not shown).

Each side wall of the housing section A comprises a slot 2, said slots being transversely alined for the reception of the trunnions or shaft terminals 3 of a spool or reel 4, which, in example illustrated, is an ordinary commercial spool upon which an unexposed photographic film F is wound.

The trunnions 3 of reel 4 may be retained within the respective slots 2 in any suitable manner. As shown, a latch or locking member 5 is pivoted at 6 to each side wall of the housing A. Each latch 5 preferably comprises an operating extension 5a, a cam face 5b and a transverse notch 5c. Likewise, each latch 5 is biased toward the rear of the housing by a leaf spring 7, or the like, secured at one end to the housing section A and at its other end engaging the latch. If desired, stop members or projections 8 and 9 may be provided on each side wall of the housing section A, said projections serving to limit forward and backward movement of each latch 5.

In order to place a film-holding reel 4 in position within the housing section A, the operating extensions 5a of the respective latch members 5 should be manually moved toward the stops 9. Then, by forcing the supply reel upwardly as viewed in Fig. 2, the trunnions are brought into engagement with the cam faces 5b. During continued swinging movement of the latch members 5, the trunnions 3 pass along the transverse channels 2 and finally fall within the notches 5c. In this position the film-holding reel 4 is locked in operative position by virtue of the biasing effect of the leaf spring 7.

In accordance with my invention, rotatable movement of the film-holding reel 4 should be suitably retarded or restrained, for this purpose, there may be utilized one or more leaf springs 10 secured at one end to the housing section A and at or adjacent its or their other end or ends, engaging the end flanges 11 of the film-holding reel.

Supported in transverse alined bearings or openings in the respective side walls of the housing section A is the shaft 12 of a drum or cylinder 13. In the example illustrated, shaft 12 has keyed or secured thereto a hub 14 comprising a flanged portion to which an internally toothed member 15 is suitably secured, as by screws 16. Ordinarily, a second actuating member is secured to the shaft 12 and, as shown, a pulley 17 for this purpose may be secured to the flange of hub 14 by the aforesaid screws 16.

Figures 2, 3:
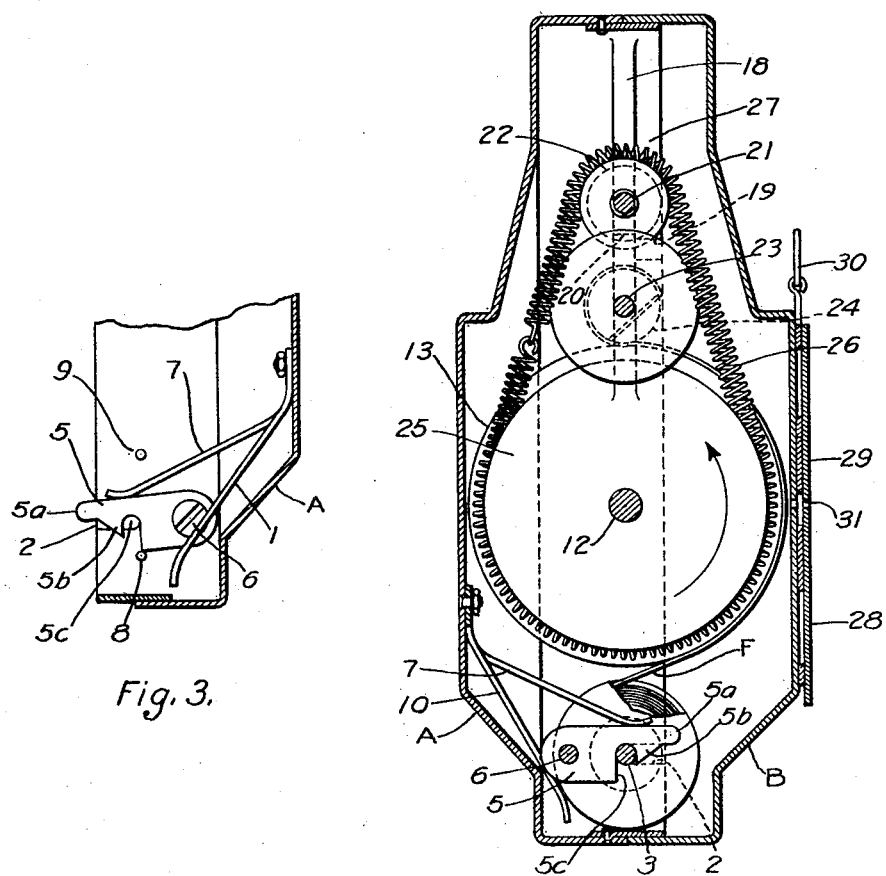
Fig. 2 is a vertical sectional view taken on the line II—II of Fig. 1.
Fig. 3 is a vertical sectional view taken on the line III—III of Fig. 1.

As illustrated in Figs. 1 and 2, each side wall of the housing section A is provided with a longitudinally extending groove or passage 18, into each of which a transverse channel 19 opens. Interposed in each passage 18, intermediate its ends and adjacent the channel 19 is a member or pin 20.

Disposed in the grooves 18 between the members 20 and the upper ends thereof, Fig. 2, are the shaft terminals or trunnions 21 of a drum or cylinder 22. Likewise, disposed in said grooves 18 between the members 20 and the lower ends thereof, as viewed in Fig. 2, are the shaft terminals or trunnions 23 of a reel 24, upon which the film F is wound, as hereinafter described.

Secured to the shaft 12 between the edges of drum 13 and the respective side walls of the housing section A are the pulleys 25, each receiving a belt 26 adapted to encircle a pulley 27, each disposed on the shaft 21 of drum 22 in alinement with the respective pulleys 25. Belts 26 should be constructed of elastic material, as rubber, or, and preferably, from a helically wound element, such as piano wire.

The operation is as follows:

With the film-holding spool 4 in the position shown, the end-portion of the film F is passed around the right-hand surface of drum 13 and threaded through the usual slot provided in an empty spool 24. The first few inches of the film usually consist of paper only, while the succeeding portion preferably consists of a light-sensitive web only. The supply spool 4 when placed in position is so arranged that the light-sensitive web will be toward the right while the insensitive side will contact with the drum 13.

The housing cover B is now placed in position on the section A and the parts secured together by screws, or the like (not shown).

Thereafter, upon application of motive power to the shaft 12, drum 13 is rotated in a counter clockwise direction, Fig. 2. The belts 26 transmit power to the drum 22 and the latter, due to its frictional engagement with the film wound on reel 24, causes rotation thereof. As a result, the film is transferred from the reel 4 to the reel 22 along a path including a portion of the periphery of drum 13, the latter also frictionally engaging the film wound on reel 24 and thereby assisting in the film-transferring operation.

During progressive increase in the diameter of the film wound upon reel 24, the drum 22 recedes farther and farther from said reel 24, the resilient belts 26 stretching to permit this action.

Due to the fact that the diameter of each pulley 25 is somewhat greater than is necessary to drive the drum 22 at the same peripheral velocity as that of the drum 13, said roller 22 tends to roll up the film F faster than it is delivered by the main drum 13. But, the friction effect between the film F and drum 22 so controls the latter that it has the same peripheral velocity as the film F. This action merely causes the belts 26 to stretch more on one side than on the other.

The leaf springs 10 restrain rotation of the supply reel 4 and the film F is at all times maintained in a taut condition. The frictional effect thus exercised by the springs 10 and the aforesaid frictional effect between the film F and drum 22 causes less stretching of the belt convolutions on the right-hand side and more stretching thereof on the left-hand side than is the case while the apparatus is inoperative, Fig. 2.

In the example illustrated, the wall of the housing section B comprises a flat portion to which, in spaced relation, a plate or member 28 is secured. Slidable in the space between the member 28 and the flat portion of housing section B is a shutter 29 having an operating handle 30 and adapted to close or open an elongated slot 31 through which a light beam may be passed into co-acting relation with the film F.

The mechanism herein illustrated is adapted for use in connection with a surge recorder and more particularly an oscillograph, in which latter case, the drum 13 may be rotated by the oscillograph mechanism. However, it shall be understood that said mechanism may be used in connection with apparatus other than an oscillograph, or surge recorder when desirable or suitable.

I claim as my invention:

1. The combination with supply and take-up reels carrying a record-receiving member, of a drum engaged by said member during transfer thereof, a drum for driving said take-up reel, driving means directly connecting said drums, and means for driving said first-named drum.

2. The combination with supply and take-up reels carrying a light-sensitive record-receiving member, of means for restraining rotation of said supply reel, a rotatable drum engaged by said member, a second drum contacting with said record-receiving member for driving said take-up reel, and means comprising a belt for driving said second drum in accordance with the rotation of said first mentioned drum, said reels and said drums being located within a light-proof casing.

3. The combination with supply and take-up reels carrying a light-sensitive record-receiving member, of means for restraining rotation of said supply reel, a rotatable drum engaged by said member, a second drum for driving said take-up reel, and driving means connecting said drums for rotating said second drum at greater angular velocity than said first-named drum, said reels and said drums being located within a light-proof casing.

4. The combination with supply and take-up reels carrying a light-sensitive record-receiving member, of means for restraining rotation of said supply reel, a rotatably mounted drum engaged by said member, a second drum for driving said take-up reel, and means comprising a plurality of elastic belts for connecting said drums for causing the rotation of said second drum at greater angular velocity than said first-named drum, said reels and said drums being located within a light-proof casing.

5. The combination with supply and take-up reels carrying a record-receiving member, of means for restraining rotation of said supply reel, a rotatably mounted drum engaged by said member during transfer thereof, a second drum for driving said take-up reel and of substantially less diameter than said first-named drum, and flexible means for connecting said drums and tending to rotate said second drum at greater peripheral velocity than said first-named drum.

6. The combination with a supporting member, of a supply reel for a record-receiving film carried by said member for rotatable movement only, a drum likewise carried by said member for rotatable movement only, said drum translating said film and being spaced from said supply reel, and a take-up reel for said film adjacent to said drum and in surface contact therewith, means permitting lateral movement of said take-up reel, and means including a second drum engaging said take-up reel for controlling the rotation of said reel, and means for preventing light from reaching any surface of said reels or said drums other than the surface of said first-named drum.

7. The combination with supply and take-up reels carrying a record-receiving member, of a rotatably mounted drum engaged by said member during transfer thereof, a second drum for driving said take-up reel, said take-up reel being in frictional engagement with said drums and having a maximum diameter which is substantially less than that of said first-named drum, and a flexible belt connecting said drums, the two end loops of said belt engaging said drums.

8. The combination with supply and take-up reels carrying a record-receiving member, of a drum engaged by said member during transfer thereof, a second drum, said take-up reel being positioned between, and in contact with, said drums, a belt connecting said drums whereby said second drum is rotated by the rotation of said first drum, and means for driving said first drum.

9. In combination, supply and take-up reels carrying a record-receiving member, means for restraining rotation of said supply spool, a driving drum engaged by said record-receiving member during transfer thereof, a second dum, said take-up reel being positioned between, and in contact with, said drums, said take-up reel and said second drum being movable in a direction toward or away from said first drum, and an uncrossed flexible belt connecting said drums, the two end loops of said belt engaging said drums.

10. The combination with supply and take-up reels carrying a record-receiving member, of a drum engaged by said member during transfer thereof, a second drum, said take-up reel being positioned between, and in contact with, said drums, said take-up reel and said second drum being mounted with their axis in a plane passing through the axis of said first drum and being movable in said plane in a direction toward or away from said first drum, and an uncrossed belt connecting said drums, the end loops of said belt engaging said drums.

In testimony whereof, I have hereunto subscribed my name this 25th day of May, 1927.

JOSEPH W. LEGG.